United States Patent
Kelly et al.

(10) Patent No.: US 9,813,553 B2
(45) Date of Patent: Nov. 7, 2017

(54) DEVICE, SYSTEM, AND METHOD FOR OPTIMIZING ACTIVE TRANSACTIONS OF AN AGENT

(71) Applicant: Avaya Inc., Santa Clara, CA (US)

(72) Inventors: Edel Kelly, Galway (IE); Liam Loftus, Galway (IE); Seamus Hayes, Galway (IE); Will Meaney, Galway (IE)

(73) Assignee: Avaya Inc., Santa Clara, CA (US)

( * ) Notice: Subject to any disclaimer, the term of this patent is extended or adjusted under 35 U.S.C. 154(b) by 0 days.

(21) Appl. No.: 14/919,057

(22) Filed: Oct. 21, 2015

(65) Prior Publication Data

US 2017/0118341 A1    Apr. 27, 2017

(51) Int. Cl.
  *H04M 3/00*  (2006.01)
  *H04M 5/00*  (2006.01)
  *H04M 3/51*  (2006.01)
  *H04M 3/523*  (2006.01)
  *H04M 3/58*  (2006.01)

(52) U.S. Cl.
  CPC ....... *H04M 3/5141* (2013.01); *H04M 3/5233* (2013.01); *H04M 3/58* (2013.01); *H04M 2201/16* (2013.01); *H04M 2201/50* (2013.01)

(58) Field of Classification Search
  CPC . H04M 3/5191; H04M 3/5108; H04M 3/5235
  USPC .............................. 379/265.09, 265.01, 309
  See application file for complete search history.

(56) References Cited

U.S. PATENT DOCUMENTS

| | | | |
|---|---|---|---|
| 6,704,409 B1 * | 3/2004 | Dilip ..................... | H04M 3/523 379/243 |
| 2002/0131399 A1 * | 9/2002 | Philonenko ............. | H04L 29/06 370/351 |

\* cited by examiner

*Primary Examiner* — Quynh Nguyen (57) ABSTRACT

A device, system, and method optimizes active transactions of an agent. The method performed using a prioritizing device of a contact center includes determining a first priority value of an incoming transaction, the incoming transaction included in a user request received by the contact center, the incoming transaction requiring utilization of a real-time communication channel. When the first priority value is greater than a predetermined threshold value, the method includes identifying an agent device associated with the contact center to process the incoming transaction, said agent device currently processing an ongoing transaction. The method includes transferring the ongoing transaction from the agent device. The method includes transferring the incoming transaction to the agent device.

20 Claims, 4 Drawing Sheets

DEVICE, SYSTEM, AND METHOD FOR OPTIMIZING ACTIVE TRANSACTIONS OF AN AGENT

BACKGROUND

A contact center may be used by a provider to enable a user to submit a query or request (collectively referred hereinafter as a "transaction") for an issue or a service handled by the provider. Specifically, an agent may be employed at the contact center who receives a ticket associated with the transaction such as via an email communication, a Web form communication, a chat session, a voice communication, a video communication, etc. The ticket may include all relevant information for the agent to properly generate a response for the user. The agent may utilize any available resource to determine the correct response for the ticket. For example, the agent may rely upon proprietary tools, publicly available information, privacy information corresponding to the user, etc.

The contact center may enable the agent to handle the transaction in a variety of manners. For example, a real-time communication or a non-real-time communication may be performed. As noted above, the email communication and the Web form communication may be non-real-time communications whereas the chat session, the voice communication, and the video communication may be real-time communications. That is, the transactions performed through non-real-time communications may be performed at any time after receipt whereas the transactions performed through real-time communications may be performed at the time they are received. Due to the nature in which real-time communications are performed between the agent and the user, the transactions may be categorized in differing levels of urgency such as real-time communications having a higher priority over non-real-time communications.

To improve an efficiency upon which each of the agents may perform their duties, the contact center may be configured with multiplicity for each of the agents. Multiplicity may relate to an ability to present a plurality of transactions concurrently to the agents for processing. Accordingly, the process of multiplicity may allow agents to, for example, speak with a user in a voice communication in a first transaction while responding to users via an email and/or a chat communication in parallel to increase productivity at the contact center. Multiplicity is typically under the control of administrators who decide depending on agent capabilities on how many transactions may be presented in parallel. Multiplicity may make the contact center more nimble and efficient for handling large numbers of different transaction types and volumes of transactions.

However, an increasingly more available format to submit and resolve a transaction request in real-time between the user and the agent of the contact center involves the use of a video communication such as Web Real Time Communication (WebRTC). In the video communication, a real-time video call mechanism enables the user to view the agent and vice versa while discussing the transaction.

BRIEF SUMMARY

The present disclosure is directed to a method comprising: determining, using a prioritizing device of a contact center, a first priority value of an incoming transaction, the incoming transaction included in a user request received by the contact center, the incoming transaction requiring utilization of a real-time communication channel; when the first priority value is greater than a predetermined threshold value: identifying, using the prioritizing device, an agent device associated with the contact center to process the incoming transaction, said agent device currently processing an ongoing transaction; transferring, using the prioritizing device, the ongoing transaction from the agent device; and transferring, using the prioritizing device, the incoming transaction to the agent device.

The present disclosure is directed to a prioritizing device of a contact center, the contact center receiving a user request, the user request comprising a request to process an incoming transaction requiring utilization of a real-time communication channel, the prioritizing device comprising: a transceiver communicating via a communications network to receive information associated with the incoming transaction; and a processor coupled to the transceiver that: determines a priority value of the incoming transaction based upon the information; when the priority value is greater than a predetermined threshold value, identifies an agent device associated with the contact center to process the incoming transaction, said agent device currently processing an ongoing transaction; transfers the ongoing transaction from the agent device; and transfers the incoming transaction to the agent device.

The present disclosure is directed to a contact center system comprising a server that receives a user request for processing a plurality of transactions that utilizes a real-time or a non-real-time communication channel; a plurality of agent devices coupled to the server that process the plurality of transactions received by the contact center system; wherein the server comprises a prioritizing device that prioritizes the plurality of transactions and controls a queue associated with each of the plurality of agent devices; wherein when a first agent is processing an ongoing transaction and an incoming transaction is received by the server requiring utilization of the real-time communication channel, the prioritizing device: determines a priority value of the incoming transaction; when the priority value is greater than a predetermined threshold value, identifies the first agent device to process the incoming transaction; determines the ongoing transaction being processed by the first agent device; transfers the ongoing transaction for the transaction to be processed to the first agent device; and transfers the incoming transaction to the first agent device.

DETAILED DESCRIPTION

The exemplary embodiments may be further understood with reference to the following description and the related appended drawings, wherein like elements are provided with the same reference numerals. The exemplary embodiments are related to a device, a system, and a method for optimizing how transactions are to be processed by an agent of a contact center. Specifically, the agent may be processing a transaction at a time when an incoming transaction is received. Based upon a priority upon which the incoming transaction is to be performed, the exemplary embodiments may determine a manner in which the agent is to process the transactions. The contact center, the agent, the transactions, the priority, and a related method will be described in further detail below.

Initially, it should be noted that the exemplary embodiments described herein relate to a contact center that performs transactions. However, those skilled in the art will understand that the exemplary embodiments may be applied to any system in which a first user communicates over a communication channel with a second user. Thus, the contact center used herein may represent any of these systems. It should also be noted that the use of the agent and the user is only exemplary. Those skilled in the art will also understand that the exemplary embodiments may be applied to any first user who represents a first party to the communication with any second user who represents at least one second party to the communication.

The exemplary embodiments are configured to address issues of prioritizing transactions to be processed by agents of the contact center based upon, for example, transaction type by considering a priority of an incoming transaction and how transactions that are currently being processed by a selected agent are to be transferred. The exemplary embodiments may further be configured to determine how transactions that are not being processed at the time the incoming transaction is received but are to be processed by the selected agent (e.g., in a queue) are to be managed (e.g., transferring using a respective priority). In a specific example, the contact center may be configured with video communications between the agent of the contact center and the user. The video communication may be a high priority transaction due at least to its live or real-time nature with the user being present at the time the transaction is to be performed. Furthermore, the video communication presents additional considerations such as a visual feed between the user and the agent as the user may recognize when the agent is not dedicated wholly to the video communication transaction. Thus, the exemplary embodiments provide a mechanism in which the agent may focus completely on the video communication transaction as no further transaction may be processed concurrently (e.g., when the agent has multiplicity). That is, the agent may be constructively forced to ignore any other transaction from being processed while performing the video communication transaction.

For example, the agent may be employed at a contact center associated with a sales organization. The profile of the agent includes multiplicity such that the agent may be presented concurrently with multiple transactions including emails, chat communications, and either a voice or a video communication. Specifically, the agent may process one or more transactions at the same time. Although the contact center may utilize the video communication, this feature may not warrant a dedicated agent who solely performs this type of transaction due to, for example, an insufficient workload. This may not be feasible since an agent who is assigned exclusively for video communications only may have significant idle time (e.g., low volume of video communication transactions). Thus, any qualified agent of the contact center may be provided this transaction. During the course of processing transactions such as emails and ongoing chat communications, the agent may have a video communication transaction forwarded thereto (e.g., the contact center selects the agent to process the video communication transaction and places the video communication transaction in a queue of the agent). With no mechanism in place, it is the responsibility of the agent to determine how to handle the ongoing active transactions including the video communication transaction since the agent may be required or suggested to provide full attention to the video communication transaction. The exemplary embodiments provide a mechanism to address such a scenario such that the contact center may automatically determine the manner in which the transactions of the agent are to be handled.

Figure 1:
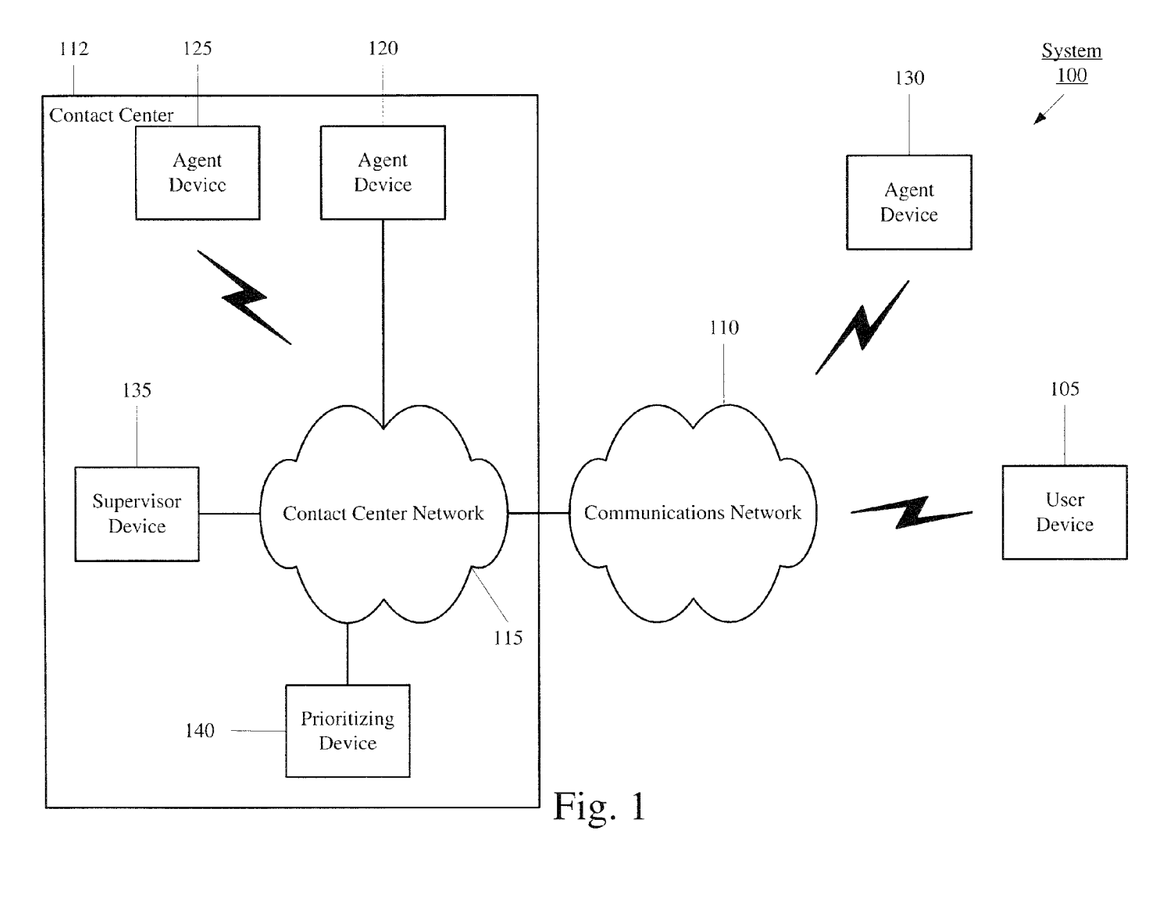
FIG. 1 shows an exemplary contact center system according to the present disclosure.

FIG. 1 shows an exemplary embodiment of a system 100 including a contact center 112 and channels for a user to communicate with the contact center 112. The system 100 may include a communications network 110 and a contact center communications network 115 which are communicatively connected to one another. Accordingly, a user device of the user connected to the communications network 110 may communicate with the contact center. The system 100 may enable a user device 105 utilized by a user to perform a transaction via the communications network 110 and the contact center network 115 to an agent device 120 utilized by an agent so that a communication may be established therebetween in real-time or non-real-time for the transaction to be processed. As will be described in further detail below, the system 100 may further include a prioritizing device 140.

The user device 105 may represent an electronic device in which a user may perform a transaction with the contact center 112. The transaction and its resolution may be performed over non-real-time communication channels (e.g., an email, a Web form communication, etc.) or real-time communication channels (e.g., a chat communication, a voice communication, a video communication, etc.). That is, the contact center 112 may be configured to enable the user device 105 to utilize different multimedia channels in which to process the transaction (e.g., a video communication channel, a voice communication channel, a text communication channel, etc.). For example, the user device 105 may be any electronic component that is configured to communicate via the communications network 110 using the video communication such as a desktop computer, a laptop, a smartphone, etc. The user device 105 is shown as wirelessly communicating with the communications network 110. However, it should be noted that the user device 105 may also connect to the communications network 110 using other means such as a wired connection. Accordingly, the user device 105 may include corresponding components to enter information for the transaction (e.g., an input/output (I/O) device), to connect to the communications network 110 (e.g., a transceiver), to transmit the transaction, to perform the transaction (e.g., an imager), etc.

The communications network 110 may represent any single or plurality of networks used by the user device 105 to communicate with the contact center via the contact center network 115. For example, if the user device 105 is a personal home computer, the communications network 110 may include a home network in which the user device 105 may initially connect. The home network may connect to a network of an Internet service provider to connect to the Internet. Subsequently, through the Internet, a connection may be established with the contact center network 115. It should be noted that the communications network 110 and all networks that may be included therein may be any type of network. For example, the communications network 110 may be a local area network (LAN), a wide area network (WAN), a virtual LAN (VLAN), a WiFi network, a HotSpot, a cellular network (e.g., 3G, 4G, Long Term Evolution (LTE), etc.), a cloud network, a wired form of these networks, a wireless form of these networks, a combined wired/wireless form of these networks, etc. The communications network 125 may also represent one or more networks that are configured to connect to one another to enable the data to be exchanged among the components of the system 100.

The contact center network 115 may enable a plurality of devices to be interconnected with one another. For example, the contact center network 115 may be a proprietary network accessible in one manner by the agent devices 120-130, the supervisor device 135, and the prioritizing device 140. Specifically, the agent devices 120-130, the supervisor device 135, and the prioritizing device 140 may be connected to the contact center network 115 via an authorized or privileged connection for select information and data to be accessed. However, as discussed above, the contact center network 115 may be accessed in another manner via the communications network 110 by the user device 105. This connection may enable communications to be transmitted and/or received between the end devices without access to the above noted information and data, particularly using the video communication.

The contact center network 115 may also enable direct connections thereto using, for example, both wired and wireless connections. Specifically, the agent device 120 may utilize a wired connection to establish the connection with the contact center network 115. The agent device 125 may utilize a wireless connection to establish the connection with the contact center network 115. Furthermore, the agent device 120 and the agent device 125 may be within a predetermined proximity of the contact center network 115 in order to establish the connection. Using an authorization procedure (e.g., login and password), the connection for the agent devices 120, 125 may be established. In addition, the contact center network 115 may enable remote connections thereto using, for example, the communications network 110. For example, an agent may work remotely from a location that is outside the proximity of the contact center network 115 such as the agent device 130. Using authentication, authorization, and accounting (AAA) procedures (via a AAA server), the agent device 130 may establish a connection with the contact center network 115 in a substantially similar manner as the agent devices 120, 125.

In view of the above description of the contact center network 115, it should be noted that the contact center network 115 may include a variety of components (not shown) to enable these functionalities. For example, the contact center network 115 may include a server, a router, a switch center, a network management arrangement, a database, etc. It should also be noted that the use of three agent devices 120-130 is only exemplary. Those skilled in the art will understand that the contact center 112 may utilize any number of agent devices. It should further be noted that the use of one supervisor device 135 is only exemplary. Those skilled in the art will understand that the contact center 112 may utilize any number of supervisor devices to manage one or more agent devices.

Figure 2:
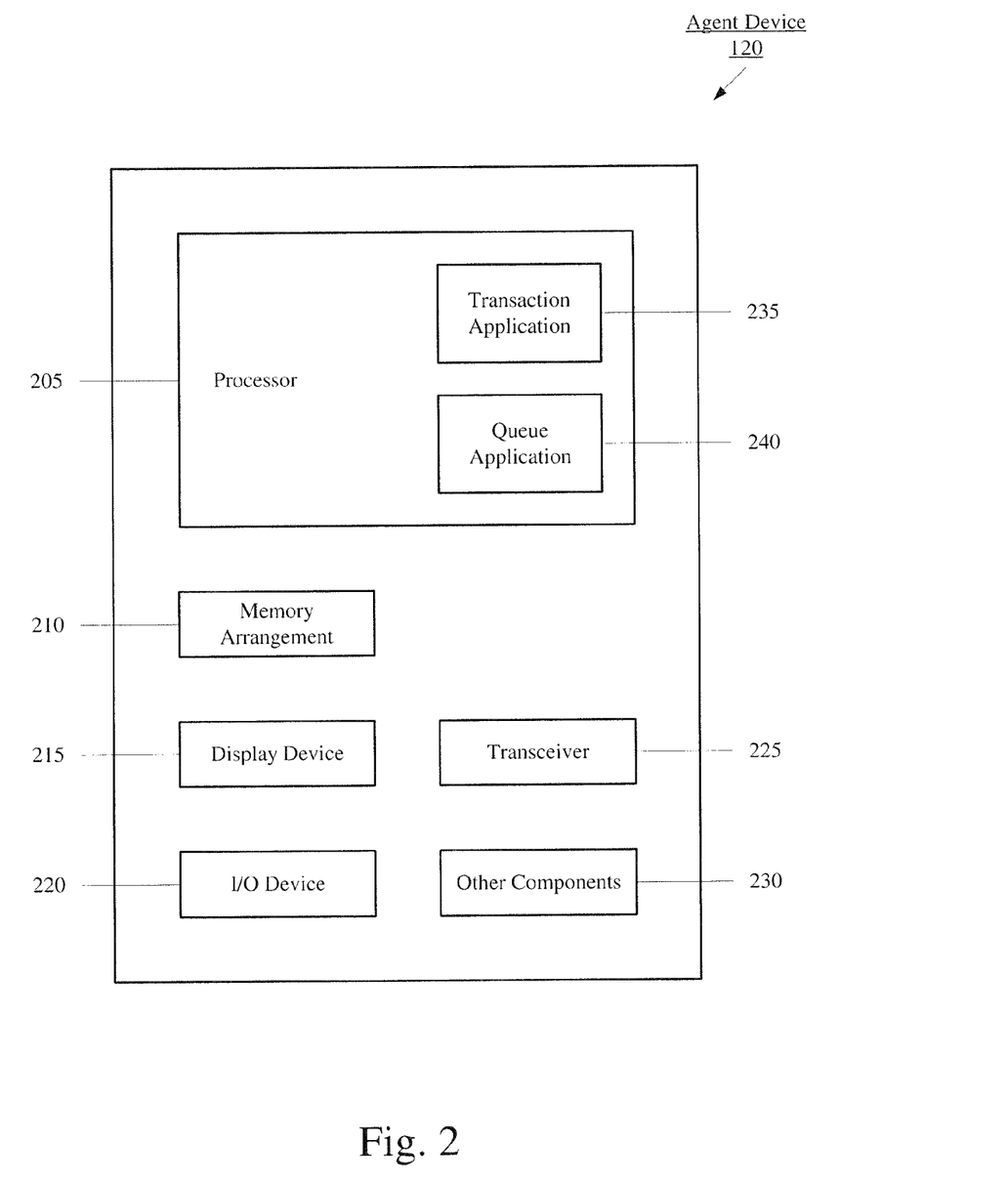
FIG. 2 shows an exemplary agent device of the contact center system of FIG. 1 according to the present disclosure.

FIG. 2 shows an exemplary embodiment of an agent device 120 of the contact center system 100 of FIG. 1. As discussed above, the agent device 120 may be utilized by an agent to receive a request from a user, via the user device 105, and to perform a transaction therewith. The agent may subsequently use a process to determine a response or resolution for the transaction. For example, in a transaction utilizing a non-real-time communication channel, the agent may review the request and generate the response for delivery to the user device 105. In another example, in a transaction utilizing a real-time communication channel, the agent may determine the response during the communication. The description herein for the agent device 120 may be representative of the agent devices 125, 130 as well. The agent device 120 may also represent any electronic device that is configured to perform the functionalities described herein. For example, the agent device 120 may be a portable device such as a tablet, a laptop, etc. In another example, the agent device 120 may be a client stationary device such as a desktop terminal. The agent device 120 may include a processor 205, a memory arrangement 210, a display device 215, an I/O Device 220, a transceiver 225, and other components 230 (e.g., an imager, an audio input device (for use during the voice or video communication), an audio output device (for use during the voice or video communication), a battery, a data acquisition device, ports to electrically connect the agent device 120 to other electronic devices, etc.).

The processor 205 may be configured to execute a plurality of applications of the agent device 120. For example, the applications may include a web browser when connected to the contact center network 115 and also the communications network 110 via the transceiver 225. In another example, the applications may include a call application (e.g., to establish a voice communication), a chat application (e.g., to establish a chat communication), a video application (e.g., to establish a video communication, etc. between the agent device 120 and the user device 105.

In a further example, the processor 205 may execute a transaction application 235. The transaction application 235 may include a plurality of tools and receive other information determined from other applications such as the web browser. The transaction application 235 may also perform the communication functionality. For example, with a real-time communication such as a video communication, the transaction application 235 may have a transaction from the user forwarded to the agent device 120 (e.g., through a switch component of the contact center network 115) and establish the video communication session via the video communication channel between the agent and the user.

In a yet further example, the processor 205 may execute a queue application 240. The queue application 240 may operate in conjunction with the transaction application 235. Specifically, the queue application 240 may receive the transactions from the contact center network 115 that are intended to be processed by the agent of the agent device 120 (e.g., within a given work period). Therefore, the queue may be filled and may include any number of transactions such as zero (e.g., when the agent logs into the system of the contact center or completes all items of the queue), one, or more than one. The queue application 240 may track the transactions that have been completed, that are in progress (i.e., currently being processed) (hereinafter referred to as "ongoing transactions"), and that are to be completed by the agent (hereinafter referred to as "pending transactions"). The queue application 240 may also enable a user interface that provides the transactions selectable to be processed by the agent. As with multiplicity, the agent may select one or more transactions to be processed using the transaction application 235.

It should be noted that the queue of the transactions may be maintained in a variety of locations. For example, the queue application 240 may generate the queue and be stored in the memory arrangement 210 of the agent device 120. In another example, the queue may be maintained using other devices associated with the contact center. The other devices may include a server of the contact center, a cloud utilized by the contact center, etc. That is, the queue application 240 may operate with the other device for the agent to utilize the queue. It is also noted that the items of the queue may be managed in a variety of manners. For example, ongoing transactions may have been removed from the queue to be processed whereas pending transactions may remain in the queue to be selected for processing. Thus, the queue may only include items that are not being processed currently but are to be processed at a later time.

It should also be noted that the above noted applications each being an application (e.g., a program) executed by the processor 205 is only exemplary. The functionality associated with the applications may also be represented as a separate incorporated component of the agent device 120 or may be a modular component coupled to the agent device 120, e.g., an integrated circuit with or without firmware.

The memory 210 may be a hardware component configured to store data related to operations performed by the agent device 120. Specifically, the memory 210 may store data related to the web browser, the transaction application 235, the queue application 240, etc. For example, the call application may utilize a contact list who may be experts or consultants required to reach during the response process. The display device 215 may be a hardware component configured to show data to a user while the I/O device 220 may be a hardware component that enables the user to enter inputs. It should be noted that the display device 215 and the I/O device 220 may be separate components or integrated together such as a touchscreen.

The transceiver 225 may be a hardware component configured to transmit and/or receive data, particularly related to processing the transaction using a real-time communication. That is, the transceiver 225 may enable the communication with other electronic devices directly or indirectly through a network based upon an operating frequency of the network. The transceiver 225 may operate on a variety of different frequencies or channels (e.g., set of consecutive frequencies) that are related to the functionalities of the different applications being performed.

As described above, the agent devices 120-130 may execute the transaction application 235. Specifically, the user device 105 may transmit information included in a request for a transaction such as in the form of a ticket to the contact center 112. The contact center 112 may process the request and determine an appropriate agent to deliver the transaction to subsequently establish the communication with the user of the user device 105. Those skilled in the art will understand that the selection of the agent may be performed in a variety of manners. For example, each agent may have qualifications and/or indicators associated with an agent identity. The request for the transaction may be processed to determine any indicators or tags that are included therein. For example, the user device 105 may be prompted to select various fields while completing the request. The fields may include these indicators or tags. Therefore, the appropriate agent may be selected to have the request transmitted. As the transaction may be processed by any of the agents of the contact center 112, the transaction may be transferred to any available agent based upon a variety of factors such as current workload.

While processing the transaction with the user of the user device 105, the agent may perform a response process to determine how to address the transaction. There are a variety of different ways including a variety of different mechanisms to use in which the response process may be performed as well as in a variety of different contexts based upon a product or service that the contact center 112 is associated. For example, if the contact center relates to determining an insurance quote, the agent may utilize the transaction application 235 that may include a quote calculator that incorporates the information that the user has provided. Those skilled in the art will understand that any number of different tools and information may be used in the response process and that the exemplary embodiments may be applied to each of these different scenarios. For example, as discussed above, the transaction application 235 may include a plurality of tools or the agent may utilize further applications to receive information that may be used in the response process.

With multiplicity, the agent may process a plurality of transactions concurrently although only a single voice or video communication may be performed at a time. However, it may be possible to perform a plurality of voice/video communications using, for example, a hold functionality. The queue application 240 may provide an interface upon which transactions may be transmitted to the agent device 120 for the agent to process. For example, non-real-time communications may be presented to the agent at any time via the queue application 240 such that a response may be provided in a timely manner to the user. In another example, chat communications may be presented to the agent when received and the agent may process the chat communication transaction when available to process the transaction given the other ongoing transactions being processed. Specifically, the agent may manually accept or initiate the chat communication. Accordingly, the queue application 240 may generate a queue of pending transactions for the agent. The queue application 240 may continuously receive pending transactions for the agent and add them to the queue until a predetermined time (e.g., 30 minutes prior to an end of a shift). For example, the contact center 112, via the contact center network 115, may automatically transfer the transactions based upon qualification or availability. In this manner, the agent may be provided a plurality of transactions and may process the transactions in a single manner or a plural manner (when multiplicity allowed). When transactions are initiated and/or completed, the items may be removed from the queue.

It should again be noted that the transaction application 235 and the queue application 240 may be used for any type of product or service that the contact center is associated. The exemplary embodiments may be applied in each of these instances and provide the functionalities described herein without significant modifications thereto. For example, the contact center may be used for any product or service ranging from sales, insurance, customer service, etc. and the exemplary embodiments may be used therewith.

Returning to the system 100, the supervisor device 135 may be utilized by a supervisor who is responsible for a plurality of agents such as those using the agent devices 120-130. The supervisor may be configured to monitor the actions performed by the agents as well as the processing of the transactions. The supervisor may also be provided override functionalities such as manually transferring an incoming transaction to an agent as well as manually redistributing transactions assigned and entered into a first queue of a first agent into a second queue of a second agent.

Figure 3:
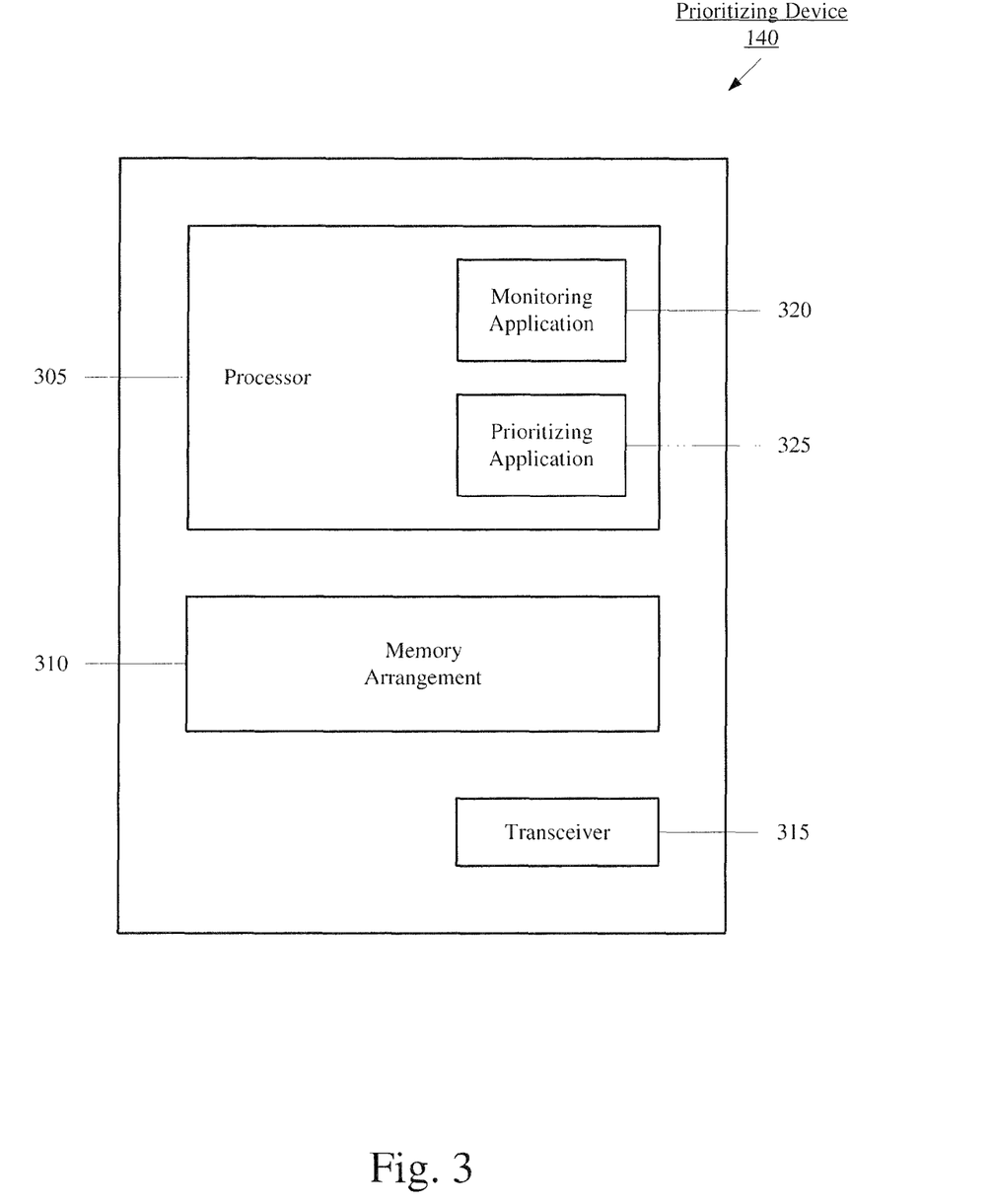
FIG. 3 shows an exemplary prioritizing device of the contact center system of FIG. 1 according to the present disclosure.

FIG. 3 shows an exemplary embodiment of the prioritizing device 140 of the system 100 of FIG. 1. As discussed above, the prioritizing device 140 may provide a mechanism that determines how pending and ongoing transactions are to be handled when a high priority transaction has been received by the agent. Specifically, the prioritizing device 140 may monitor the agent device 120 and, when the high priority transaction is received and determined to be bound for the agent device 120, subsequently clear the ongoing transactions of the agent device 120 such that the high priority transaction is the only item to be processed. The prioritizing device 140 may also manage the queue of the agent such as clearing select items or all items in the queue and/or utilizing a mechanism to prevent usage of the queue. As will be described below, the clearing of the ongoing transactions and the pending transactions may include a redistribution or transfer functionality being performed. It should be noted that the prioritizing device 140 being a component of the contact center 112 is only exemplary. In other exemplary embodiments, the prioritizing device 140 may be a separate component, a remote component, a third party component, etc. Accordingly, the prioritizing device 140 may also utilize the communications network 110 to exchange data with the contact center 112.

The prioritizing device 140 may be preconfigured with a variety of parameters to perform its functionalities. For example, an administrator or the supervisor may pre-program the prioritizing device 140 to perform its intended functionality such as identifying conditions or types of communications that qualify as high priority to activate the redistribution functionality. In a substantially similar manner as the agent device 120, the prioritizing device 140 may represent any electronic device that is configured to perform the functionalities described herein. The prioritizing device 140 may include a processor 305, a memory arrangement 310, and a transceiver 315 that provide functionalities substantially similar to those corresponding to the agent device 120. It should be noted that the prioritizing device 140 may also include further components such as a display device and an I/O device that enable the administrator to configure the prioritizing device 140 to perform its intended functionalities. However, it should also be noted that the prioritizing device 140 may be configured to receive these instructions via the transceiver 215 to automatically implement the policies upon reception.

The processor 305 may be configured to execute a monitoring application 320. The monitoring application 320 may determine a progress of the agent devices 120-130 as well as determine other factors such as a current workload or queue of the agent devices 120-130. The monitoring application 320 may generally monitor the actions and processes being performed by the agents utilizing the agent devices 120-130 of the contact center 112.

The prioritizing application 325 may be configured to determine the manner in which items in a queue of a selected agent device is to be handled when a high priority transaction is received and determined to be handled by the selected agent device such as the agent device 120. As discussed above, the high priority transaction may be predetermined, may be determined based upon conditions or other information, may be determined based upon a manual input such as from the supervisor, etc. It is noted that all transactions processed by the contact center 112 may have a priority evaluated such that each transaction has a priority value associated therewith.

When predetermined, the administrator and/or the supervisor may enter the types of transactions that are to be considered high priority (e.g., through the assigned priority value). The priority may also be categorized in terms of relevance. For example, a transaction utilizing a real-time communication channel may have a higher priority than a transaction utilizing a non-real-time communication channel. That is, the real-time communication transaction using a corresponding multimedia channel may have a higher priority value than the non-real-time communication transaction. Accordingly, if the queue generated by the queue application 240 of the pending and ongoing items for the agent is ordered by priority, a real-time communication transaction may be placed in a higher position than a non-real-time communication transaction. Therefore, a voice communication, a video communication, a chat communication, etc. may be given priority over an email communication, a form communication, etc. That is, a multimedia communication may have a high priority. This division may further be subdivided into priority positioning. For example, non-real-time communications may be given an equal priority value. In another example, real-time communications may be given priority values based upon type. Thus, a video communication may be given a higher priority than a voice communication which may be given a higher priority than a chat communication. Specifically, the different real-time communication transactions may also have different priority values such as the video communication channel having a first priority value, the voice communication channel having a second priority value, and the text communication channel having a third priority value where the first priority value is greater than the second priority value which is greater than the third priority value. In this manner, the transaction may be prioritized based upon type. Accordingly, each of the transactions in the queue may have a priority value associated therewith and serve as the basis for ordering therein. Therefore, when a new transaction is received in the queue, the transactions may be rearranged with the new transaction being positioned based upon the priority value. When a common priority value is determined between two or more transactions, other criteria may be used such as time or receipt.

When based upon conditions or other information, the data associated with the transaction may be used at least partially in determining the priority of the transaction. For example, the data provided when transmitting the request for the transaction may include several fields. The fields may include an identity of the user, an item or product associated with the transaction, etc. The conditions may be predetermined (and adjustable) such that when identified, the transaction may also be identified as a higher priority transaction. In a specific example, the user may have a special relationship with the contact center 112 such as a preferred customer. Thus, any transaction submitted by the identified user may be given a higher priority than another user who does not have this status. In another specific example, a product may be given a temporary status (e.g., a recall product) such that a transaction related to this product may be given a higher priority than other products. In this manner, the transaction may be prioritized based upon conditions.

When based upon a manual input, the monitoring application 320 may provide indications (e.g., randomly) to the supervisor device 135. The supervisor (or an administrator) may select (e.g., also randomly) a transaction that may be given a high priority even when the type or the conditions do not apply. In this manner, the transaction may be prioritized manually.

Using the above mechanisms as well as the assignment of the transactions to respective agents, the queue application 240 may be provided one or more transactions to be processed by the agent as well as generate the queue of these transactions that may be ordered based upon priority (as a priority value may be associated to each transaction). According to the exemplary embodiments, a predetermined threshold value may be used as a basis to determine whether a particular transaction triggers a clearing operation of ongoing transactions as will be described below (e.g., the video communication transaction using the video communication channel may have a priority value greater than the predetermined threshold value). When the transaction is below the predetermined threshold value, the operation may not be triggered and result in the transaction being placed into the queue of the agent to be processed within a given time period. With multiplicity, the agent may process the transactions one at a time or more than one at a time. With the queue being ordered, the agent may also be aware of transactions that may be preferred to be handled in an earlier or thorough manner. The transactions in the queue may also be provided with an indication or other information such as the type of transaction such that the agent may properly select the transaction for processing (e.g., only selecting one voice communication at a time whereas multiple email communications may be processed concurrently). In this manner, the agent may process the transactions in the queue accordingly.

It should be noted that the exemplary embodiments may be further defined to omit video communications for inclusion in the queues of the agents. Specifically, the video communications may be given a priority value that is indicative of removing multiplicity such that the agent is only allowed to process the video communication transaction while ignoring any other transaction that may be ongoing or in the queue. As described above, the use of the priority value may provide such a feature as the video communication transaction may have a sufficient priority value that is greater than the predetermined threshold value. It should also be noted that the video communication transactions are used herein for the exemplary embodiments. However, those skilled in the art will understand that the operations described herein may also be utilized for any transaction that is given a substantially equal priority value or status such as a high priority chat communication, a high priority voice communication, etc.

According to the exemplary embodiments, the prioritizing application 325 may determine when a video communication transaction is to be transferred to an agent. The contact center 112 may have determined the agent for which the video communication transaction is to be processed. For example, the subject or other indicators of the transaction may be determined such that the agent is selected based upon qualifications, availability, etc. In a specific example, the availability of the selected agent may be determined based upon the priority values. That is, if a potential agent is determined to be processing a transaction currently having a priority value greater than the predetermined threshold, the contact center 112 may know that the potential agent is processing, for example, a video communication transaction. Therefore, this potential agent may be eliminated from consideration for selection for the current video communication transaction. Once the agent has been selected, the queue of the agent may also be determined or identified for the transfer of the video communication transaction. The prioritizing application 325 may determine ensuing operations to be performed such that the selected agent is capable of processing the video communication transaction. Specifically, the exemplary embodiments describe a mechanism which, on the presentation of a video communication transaction, transfers ongoing transactions and may further result in an operation to be performed on the queue and/or for pending transactions in the queue. The transfer may be performed based upon priorities of the transactions. That is, the priority value of the ongoing transactions may indicate if the ongoing transaction is to remain with the agent or redistributed to a different component of the contact center 112. When remaining with the agent, the ongoing transaction may be transferred back into the queue (to become a pending transaction). When redistributing, the ongoing transaction may be transferred to a variety of different destinations. The redistribution may have destinations that may vary such as to other agents who may be idle, to a contact center queue for transference thereafter, to an automated response application, etc. That is, the redistribution of the transactions may be to a further queue of a component of the contact center 112. It is noted that if an ongoing transaction is returned to the queue, the now pending transaction may also be subject to the redistribution.

Initially, the priority value of the ongoing transactions may determine the destination of the transfer. Specifically, the destination for this transfer may be remaining with the agent or redistribution. For example, a real-time communication may have a priority value greater than a time threshold value while a non-real-time communication may have a priority value lesser than the time threshold value. When below the time threshold value, the prioritizing application 325 may determine that the ongoing transaction is to be transferred back to the queue of the agent. In this manner, the agent may return to process the non-real-time communication (e.g., after completing the video communication transaction). When above the time threshold value, the prioritizing application 325 may determine that the ongoing transaction is to be redistributed. That is, the ongoing transaction using a real-time communication is to be transferred to another component of the contact center 112. In this manner, the ongoing transaction may continue to be processed while the user stays in communication with the contact center 112. Accordingly, with no ongoing transactions being processed, the selected agent may provide full attention to the video communication transaction.

The redistribution feature may also incorporate features that may affect the manner in which the redistribution is to be performed. In a first manner, the redistribution may be to other agents. As discussed above, the monitoring application 320 may monitor the agent devices 120-130 as well as the respective queues for each. Thus, when considering a single agent device such as the agent device 120, the monitoring application 320 may also be aware of the queues of the other agent devices 125-130. Therefore, the prioritizing application 325 may determine an idle agent or an agent having a lower workload that may have the transactions of the agent using agent device 120 who is now participating in a video communication transaction to be redistributed thereto. The prioritizing application 325 may further consider qualifications and/or capability of the other agents in redistributing the transactions. Accordingly, the ongoing transactions may be properly redistributed for proper processing to other agents in the contact center. That is, a further queue associated with the other agents may have the ongoing transaction transferred thereto. Furthermore, with ongoing transactions processed with real-time communications, the real-time nature of the ongoing transaction that is redistributed may also prompt the other agent to continue processing the ongoing transaction immediately to minimize a disconnect due to the transfer. Additional considerations may also be used such as a remaining time of a shift of the other agents and an associated time in processing the redistributed transaction (e.g., based upon subject matter). It is noted that the redistribution to the other agent may be used for ongoing transactions that are in real-time or non-real-time.

In a second manner, the redistribution may be to a contact center queue or a general queue associated with the contact center. Again, the monitoring application 320 may monitor the agent devices 120-130 including the queues for each. When the monitoring application 320 determines, for example, that the queues of the other agent devices 125-130 are at capacity or have a number of pending and/or ongoing transactions above a predetermined threshold, a corresponding indication may be provided to the prioritizing application 325. The prioritizing application 325 may thereby determine that the ongoing transactions of the agent device 120 are to be placed back into a queue associated with a server of the contact center 112. The queue of the server of the contact center 112 may be an ordered list of transactions that are received but have not yet been assigned to any of the agents. Thus, the use of the contact center queue may enable the ongoing transactions of the agent device 120 to be redistributed. The placement of the redistributed ongoing transactions into the contact center may be performed in a variety of manners. For example, the ongoing transactions may be considered as being just received such that they are placed at the end of the contact center queue. In another example, since the transactions were already assigned to the agent device 120 and to reduce any further wait time, the ongoing transactions maybe placed at a front of the contact center queue. In yet another example, the ongoing transactions may be placed back into the contact center queue based upon the priority value such that high priority value transactions are placed near a front or at the front of the contact center queue whereas low priority value transactions are placed in other locations (e.g., at an end) of the contact center queue. In a further example, the ongoing transactions may be placed into the queue but the prioritizing application 325 may perform subsequent operations to these specific redistributed ongoing transactions that remain in the contact center queue even after completion of the video communication transaction performed with the agent device 120. That is, these remaining transactions may be removed from the contact center queue and placed back into the queue of the agent device 120. It is noted that the redistribution to the contact center queue or general queue may be used for ongoing transactions that are in non-real-time and may be used for ongoing transactions that are in real-time when no further option is available.

In a third manner, the redistribution may be to an automated response application or device associated with the contact center. The monitoring application 320 may also monitor further parameters of agent devices 120-130. With an ongoing transaction, the monitoring application 320 may provide an indication for this ongoing transaction to the prioritizing application 325. The prioritizing application 325 may thus determine whether the automated response application may be capable of being used. For example, if the transaction has progressed to a complexity level where the automated response application is incapable of providing any response, the prioritizing application 325 may utilize any of the other mechanisms described above. However, if the transaction has progressed where the automated response application may be of some use, the prioritizing application 325 may redistribute the transaction to the automated response application of the contact center 112. It is noted that the redistribution to the automated response application may be used for ongoing transactions that are in real-time or non-real-time.

Furthermore, the transfer may be performed for ongoing transactions of a particular priority value. According to an exemplary embodiment, ongoing transactions may have a priority value that indicates the agent of the agent device 120 was particularly selected. For example, the priority value of select transactions may be adjusted when the agent is one of a limited number who are capable of processing the subject matter of the transaction. Thus, the ongoing transaction having the particular priority value may be kept within the queue of the agent.

The transferring of the ongoing transactions of the agent may effectively result in a clearing of the work being performed by the agent in an efficient (e.g., swift) manner to enable the agent to concentrate entirely on the newly arrived video communication transaction. The agent may then proceed to give the video communication transaction undivided attention focusing on the user to complete the processing of the transaction.

As described above, the agent may include an indication to have multiplicity configured. Thus, while processing one transaction, a further one or more transactions may be processed concurrently. For example, the agent with multiplicity may process three email transactions concurrently. In another example, the agent with multiplicity may process a voice transaction while processing a Web form transaction concurrently. In a further example, the agent with multiplicity may process a voice transaction while processing a chat transaction while also processing an email transaction. As discussed above, the exemplary embodiments also provide a mechanism where an operation may be performed on the queue when the agent device 120 has a video communication transaction transferred thereto. As will be described herein, the queue operation may provide a clearing of the queue of the agent where the clearing may be an actual clearing of the queue where pending transactions are removed from being able to be processed by the agent or a constructive clearing where pending transactions are prevented from being processed. This may therefore ensure that the agent focuses completely on the video communication transaction by removing a possibility of being distracted by processing a further transaction concurrently.

In an actual clearing of the queue, the prioritizing application 325 may redistribute pending transactions from the queue associated with the agent device 120. The redistribution of the pending transactions may be performed using the above described mechanisms for redistributing ongoing transactions. Thus, the pending transactions in the queue may be redistributed to another agent, a general queue of the contact center 112, to an automated response application, etc. Therefore, an actual clearing of the queue may enable the agent to focus on the video communication transaction.

In a constructive clearing of the queue, the prioritizing application 325 may determine whether there is at least one pending transaction in the queue to initiate this mechanism. It should be noted that the prioritizing application 325 may initiate this mechanism regardless of there being at least one pending transaction. The prioritizing application 325 may utilize a preventive functionality that prevents the agent from processing a further transaction while performing the video communication transaction. The preventive functionality may be performed in a variety of different ways. In a first example, the prioritizing application 325 may lock the queue that prevents the agent from interacting therewith. In a second example, the prioritizing application 325 may hide the queue that also prevents the agent from interacting therewith. In a third example, the prioritizing application 325 may visually clear the queue (without an actual clearing being performed) such that the agent is shown an empty queue. Therefore, a constructive clearing of the queue may enable the agent to focus on the video communication transaction.

The prioritizing application 325 may also utilize a combination of the above mechanisms. That is, the prioritizing application 325 may redistribute select pending transactions while maintaining other pending transactions in the queue. With pending transactions remaining in the queue, the latter mechanism of preventing the processing of further transactions may be utilized.

It should be noted that the exemplary embodiments may utilize further features managing the transactions of the agent. For example, a buffer may be used in which the ongoing or pending transactions that are intended to be kept within the queue of the agent are stored temporarily. Thus, when the agent has a transaction that is not to be redistributed but is to remain with the agent and also has an incoming video communication transaction, the transaction may be kept in the buffer until the video communication transaction has completed. Upon completion, the transaction in the buffer may be placed back into the queue of the agent. In this manner, the desktop and/or the queue of the agent may still appear to be cleared so that the agent may focus fully on the video communication transaction.

As described above, the transfer feature may incorporate features that may affect the manner in which the transfer of the ongoing and pending transactions is to be performed. Specifically, the transactions that are ongoing may have new or extra information associated therewith that may determine how the prioritizing application 325 is to determine how the transaction is to be handled such as remain with the agent or redistributed. That is, the information may be used for improved re-routing or redistribution. The exemplary embodiments may consider factors such as a percentage completion, transaction text, and a progress analysis.

In a first example, a percentage completion may be considered. The prioritizing application 325 may consider an actual number of the percentage completion in determining the manner in which the redistribution is to be performed for this transaction. In this manner, the prioritizing application 325 may utilize percentage threshold values. For example, a first percentage threshold value may be relatively high (e.g., 90%). When the percentage completion value of the transaction is above the first percentage threshold value (e.g., agent only needs to add a signature to a response email), the prioritizing application 325 may determine that the automated response application may automatically complete and send the reply without requiring further agent intervention. However, when the percentage completion value of the transaction is below the first percentage threshold value, the prioritizing application 325 may perform different operations. In another example and in a substantially similar manner discussed above, a second percentage threshold value may be relatively low (e.g., 10%). When the percentage completion value of the transaction is below the second percentage threshold value (e.g., agent has only reviewed the information included in the transaction), the prioritizing application 325 may determine that the transaction may be redistributed such as being placed back into the contact center queue. However, when the percentage completion value of the transaction is above the second percentage threshold value, the prioritizing application 325 may perform different operations. In a further example, a third percentage threshold value may be intermediary (e.g., 50%). When the percentage completion value of the transaction is above the second percentage threshold value but below the third percentage threshold value, the prioritizing application 325 may determine whether the transaction is to be redistributed such as to another agent who is qualified to process the transaction. As the amount of work is still within a reasonable level for another agent to take over the processing, the prioritizing application 325 may perform this operation. When the percentage completion value of the transaction is below the first percentage threshold value but above the third percentage threshold value, the prioritizing application 325 may determine whether the transaction is to be placed into the buffer such that the transaction may be placed back into the queue of the agent upon completion of the video communication transaction. In this manner, the percentage completion maybe considered.

In a second example, transaction text may be considered. During the course of processing a transaction, the user and/or the agent as well as the transaction itself with any metadata may enter or include text regarding the transaction. For example, the agent may include notes or other information that may aid in completing the transaction. In another example, the agent may have started a response email such that a partially worded email response may be included at the time the transaction is being considered for redistribution. In a further example, the text exchanged between the agent and the user in a chat communication may be analyzed. In this regard, the transaction text may be parsed and/or analyzed by the prioritizing application 325 and/or a different application or component configured for this functionality. The result of the analysis may determine whether the priority value of the transaction is to be updated. The transaction may be possible to bring to resolution by an idle agent who may not be an expert in the subject matter. As discussed above, a transaction having limited agents capable of processing may be given a different priority value such that redistribution may be prevented. However, through the progression of the transaction, the subject matter of the transaction may have returned to one that does not require the specialized qualification. Thus, through a re-evaluation of the priority value, the transaction may be capable of being redistributed. In this manner, the transaction text may be considered.

In a third example, a progress analysis may be considered. The progress analysis may relate specifically to the chat communication in which the exchanged text is analyzed. The prioritizing application 325 may analyze the up-to-date conversation proceeding in the chat communication. Subsequently, the prioritizing application 325 may determine that a redistribution may be appropriate. In particular, the prioritizing application 325 may determine whether the automated response application of the contact center 112 may be used. In this manner, the progress analysis may be considered.

It should be noted that ongoing transactions that are cleared by being redistributed or placed into a buffer may retain all work and information that has been added to the transaction. That is, when another agent or the original agent were to continue processing the ongoing transaction may continue where the previous work was left. Therefore, the redistribution may not cause the agent to begin work on the transaction anew.

Figure 4:
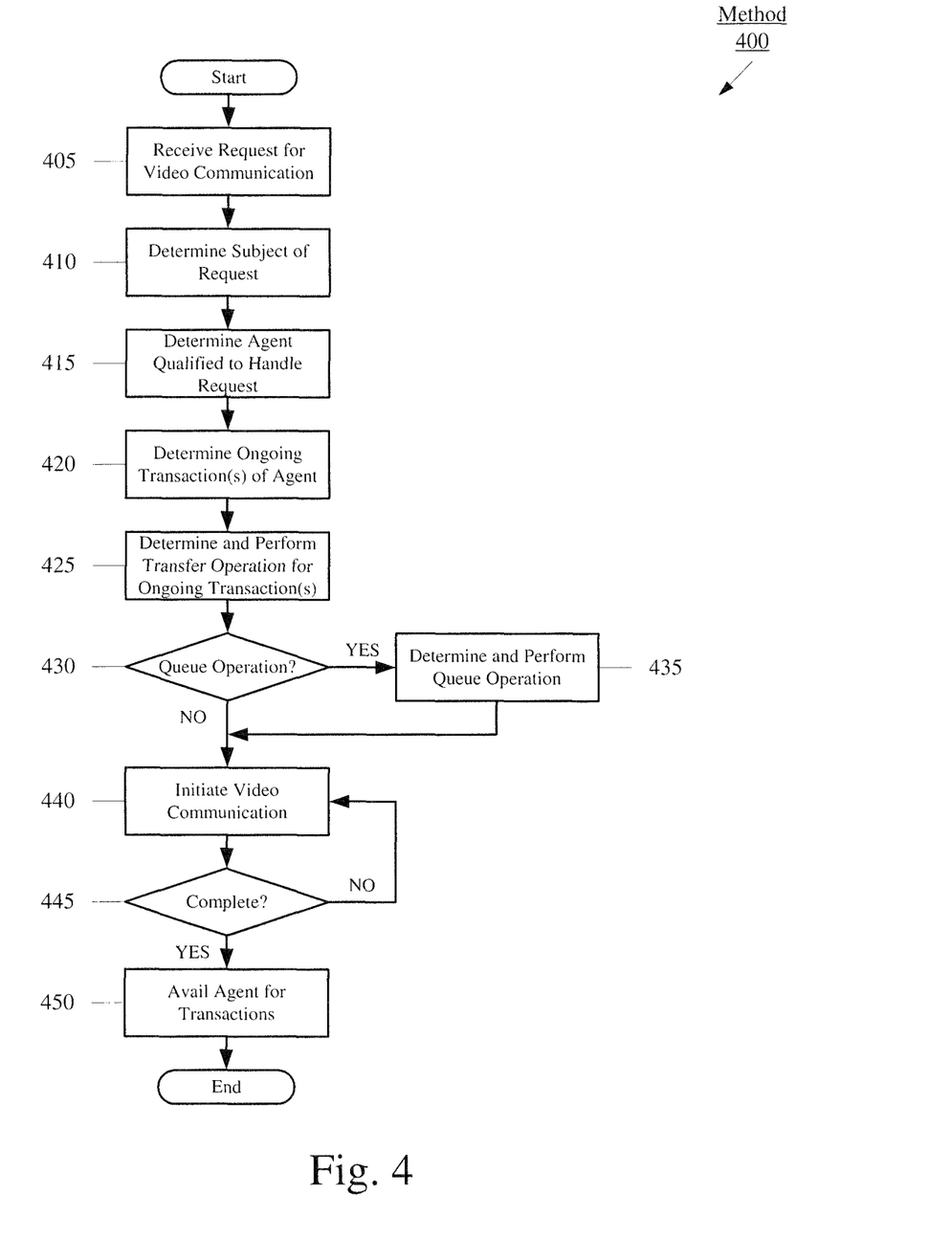
FIG. 4 shows an exemplary method for prioritizing transactions according to the present disclosure.

FIG. 4 shows an exemplary embodiment of a method 400 for prioritizing transactions according to the present disclosure. The method 400 may relate particularly to operations performed by the prioritizing application 325 of the prioritizing device 140. It may be assumed that the contact center 112 is already operational such that the agent devices 120-130 may have one or more transactions assigned thereto and in respective queues. It may also be assumed that the profiles of the agents utilizing the agent devices 120-130 indicate multiplicity such that more than one transaction may be processed concurrently. The method 400 will be described with regard to the system 100 of FIG. 1, the agent device 120 of FIG. 2, and the prioritizing device 140 of FIG. 3.

In step 405, the contact center 112 may receive a request for a transaction to be performed as a video communication from a user utilizing the user device 105. As described above, the user may utilize a ticket or form to provide information and also provide an indication as to a desired communication format. Accordingly, with the contact center 112 configured for this functionality, the contact center 112 may receive the request for further processing. The contact center 112 may also determine and assign a corresponding priority value for the transaction to be performed over the video communication channel.

In step 410, the contact center 112 may determine the subject of the request for the transaction. Using any available information, the contact center 112 may perform this determination. In a first example, the information provided in the request for the transaction may be used to determine the subject matter. In a second example, the contact center 112 may utilize an automated response functionality in which the user is first requested to provide information prior to initiating the video communication.

In step 415, the contact center 112 may select the agent qualified in handling the request. The qualification of the agent may be determined based upon a variety of factors. In a first example, the subject matter may require a particular agent or one of a subset of agents to process the transaction due to material likely to be involved in the transaction or access to information that is unavailable to other agents. In a second example, the availability of the agents may require certain agents to be deemed available while other agents are deemed unavailable. Specifically, an agent may already be performing a voice or video communication as is known via the priority value of a transaction being processed currently by the agent. The contact center 112 may consider this agent to be unavailable for the video communication transaction of the current request. Accordingly, it may be assumed that the selected agent is not performing a voice or video communication. In a third example, a workload of the agents such as indicated in the queue may indicate whether the agent has transactions that must be attended to by the agent and incapable of handling further transactions. Using these types of considerations, the contact center 112 may select the agent such as the agent utilizing the agent device 120.

In step 420, the contact center 112 determines the ongoing transactions of the agent. That is, the contact center 112 identifies the transactions currently being processed actively by the determined agent. In particular, when the agent has multiplicity, the contact center 112 may determine a plurality of ongoing transactions being processed concurrently by the agent. In step 425, the contact center 112 determines and performs a transfer operation for the ongoing transactions. As discussed above, the transfer operation may relate to whether the ongoing transaction is to remain with the agent or redistributed.

For example, the contact center 112 may determine the ongoing transactions for redistribution. That is, with the agent device 120 being selected for processing the video communication transaction corresponding to the request received in step 405, the ongoing transactions are to be transferred such that the agent may provide full focus with no distractions (due to multiplicity) in processing the video communication transaction. As discussed above, the transfer may be performed based upon a variety of factors and considerations such as the priority value.

In step 430, the contact center 112 determines whether a queue operation is to be performed. That is, the contact center 112 determines if an operation is to be performed for the pending transactions, including the ongoing transactions returned to the queue and are now pending transactions. If no queue operation is to be performed, the contact center 112 continues the method 400 to step 440. However, if a queue operation is to be performed, the contact center 112 continues the method 400 to step 435. In step 435, the contact center 112 determines and performs which of the queue operations are to be used. As described above, the queue operations may include redistributing the pending transactions, using a preventive functionality on the queue, a combination thereof, using a buffer, etc.

In step 440, the contact center 112 initiates the video communication transaction between the agent of the agent device 120 and the user of the user device 105. That is, with the transactions of the agent being cleared, the video communication transaction may be initiated properly. For example, the video communication transaction may be transferred to an actually empty or constructively empty queue of the selected agent. The video communication transaction being the only available transaction for processing for the selected agent (and with no further transactions being transferred into this queue or available for processing), the agent may focus all attention in processing the video communication transaction. In step 445, the contact center 112 determines whether the video communication transaction is completed. If still continuing, the contact center 112 returns the method 400 to step 440 where the video communication transaction is continued.

If the video communication transaction is completed and the communication has been terminated with the user device 105, the contact center 112 continues the method 400 to step 450. In step 450, the contact center 112 avails the agent device 120 for transactions. In a first example, transactions that are in the contact center queue may begin to fill the queue of the agent device 120, particularly those transactions placed into the contact center queue due to redistribution, specifically those originating from the agent device 120. In a second example, transactions that may have been placed in a buffer may be placed back into the queue of the agent device 120. In a third example, the queue may become available for use to process the pending transactions placed therein.

The exemplary embodiments provide a device, system, and method of optimizing transaction processing by an agent having multiplicity at a contact center. With the use of video communications as a type of communication to process transactions, the contact center may utilize a variety of approaches. However, assigning only video communication transactions to a group of agents may result in agent idle time if the incoming video transaction volume is not sufficiently high. Accordingly, the exemplary embodiments may provide a mechanism to automatically clear the desk of an agent by redistributing the ongoing transactions as well as pending transactions. In this manner, the agent becomes available for the video communication as well as be able to provide full attention in processing the video communication transaction as will be evidently recognized by the user.

Those skilled in the art will understand that the above-described exemplary embodiments may be implemented in any suitable software or hardware configuration or combination thereof. An exemplary hardware platform for implementing the exemplary embodiments may include, for example, an Intel x86 based platform with compatible operating system, a Windows platform, a Mac platform and MAC OS, a mobile device having an operating system such as iOS, Android, etc. In a further example, the exemplary embodiments of the above described method may be embodied as a computer program product containing lines of code stored on a computer readable storage medium that may be executed on a processor or microprocessor. The storage medium may be, for example, a local or remote data repository compatible or formatted for use with the above noted operating systems using any storage operation. Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

It will be apparent to those skilled in the art that various modifications may be made in the present disclosure, without departing from the spirit or the scope of the disclosure. Thus, it is intended that the present disclosure cover modifications and variations of this disclosure provided they come within the scope of the appended claims and their equivalent.

What is claimed is:

1. A method, comprising:
   determining, using a prioritizing device of center, a first priority value of an incoming transaction, the incoming transaction included in a user request received by the contact center, the incoming transaction requiring utilization of a real-time communication channel;
   when the first priority value is greater than a predetermined threshold value:
   identifying, using the prioritizing device, an agent device associated with the contact center to process the incoming transaction;
   identifying said agent device processing an ongoing transaction on the real-time communication channel and a non-real-time transaction on a non-real-time communication channel concurrently;
   transferring, using the prioritizing device, the ongoing transaction from the agent device; and
   transferring, using the prioritizing device, the incoming transaction to the agent device.

2. The method of claim 1, further comprising:
   determining, using the prioritizing device, a second priority value of the ongoing transaction.

3. The method of claim 1, further comprising:
   in response to determining that the first priority value indicates that the agent device is not allowed to process transactions other than the incoming transaction, transferring the non-real-time transaction from the agent device.

4. The method of claim 2, wherein the real-time communication channel comprises one of a video communication channel, a voice communication channel, and a chat communication channel, and wherein the non-real-time communication channel comprises one of an email communication channel and a Web form communication channel.

5. The method of claim 2, further comprising:
   determining, using the device, based on the second priority value of the ongoing transaction whether the ongoing transaction is transferred using one of a first transfer to a queue of the agent or a second transfer to redistribute the ongoing transaction, wherein the first transfer results in the ongoing transaction becoming a pending transaction in the queue.

6. The method of claim 5, wherein the second transfer to redistribute the ongoing transaction comprises transferring the ongoing transaction to another agent of the contact center when the second priority value indicates the ongoing transaction utilizes the real-time communication channel.

7. The method of claim 5, wherein the first transfer further comprises one of hiding the queue from the agent, locking the queue from being used by the agent, and visually emptying the queue.

8. The method of claim 5, wherein the first transfer further comprises transferring the pending transaction to a further queue.

9. The method of claim 8, wherein the further queue is one of a first queue associated with another agent of the contact center, a general queue associated with the contact center, and a second associated with an automated response device of the contact center.

10. The method of claim 9, further comprising:
    determining, using the prioritizing device, a further priority value of the pending transaction; and
    selecting, using the prioritizing device, the further queue based on the further priority value.

11. A prioritizing device of a contact center, the contact center receiving a user request, the user request comprising a request to process an incoming transaction requiring utilization of a real-time communication channel, the prioritizing device comprising:
    a transceiver communicating via a communications network to receive information associated with the incoming transaction; and
    a processor coupled to the transceiver that:
    determines a priority value of the incoming transaction based upon the information;

when the priority value is greater than a predetermined threshold value, identifies an agent device associated with the contact center to process the incoming transaction;

identifies said agent device processing an ongoing transaction on the real-time communication channel and a non-real-time transaction on a non-real-time communication channel concurrently;

transfers the ongoing transaction from the agent device; and transfers the incoming transaction to the agent device.

12. The prioritizing device of claim 11, wherein the processor further determines a second priority value of the ongoing transaction.

13. The prioritizing device of claim 11, wherein the processor further determines that the first priority value indicates that the agent device is not allowed to process transactions other than the incoming transaction and, responsively, transfers the non-real-time transaction from the agent device.

14. The prioritizing device of claim 12, wherein the real-time communication channel comprises one of a video communication channel, a voice communication channel, and a chat communication channel, and wherein the communication channel comprises one of an email communication channel and a Web form communication channel.

15. The prioritizing device of claim 12, wherein the processor further determines, based on the second priority value of the ongoing transaction, whether the ongoing transaction is transferred using one of a first transfer to a queue of the agent or a second transfer to redistribute the ongoing transaction, wherein the first transfer results in the ongoing transaction becoming a pending transaction in the queue.

16. The prioritizing device of claim 15, wherein the second transfer to redistribute the ongoing transaction comprises transferring ongoing transaction to another agent of the contact center when the second priority value indicates the ongoing transaction utilizes the real-time communication channel.

17. The prioritizing device of claim 15, wherein the first transfer further comprises one of hiding the queue from the agent, locking the queue from being used by the agent, and visually emptying the queue.

18. The prioritizing device of claim 15, wherein the transfer further comprises transferring the pending transaction to a further queue.

19. The prioritizing device of claim 18, wherein the further queue is one of a first queue associated with another agent the contact center, a general queue associated with the contact center, and a second queue associated with an automated response device of the contact center.

20. A contact center system comprising:
a server that receives a user request for processing a plurality of transactions that utilizes a real-time or a non-real-time communication channel;
a plurality of agent devices coupled to the server that process the plurality of transactions received by the contact center system;
wherein the server comprises a prioritizing device that prioritizes the plurality of transactions and controls a queue associated with each of the plurality of agent devices;
wherein a first agent is processing an ongoing transaction and an incoming transaction is received by the server requiring utilization of the real-time communication channel, the prioritizing device:
determines a priority value the incoming transaction;
when the priority value is greater than a predetermined threshold value, identifies the agent device to process the incoming transaction;
determines that the first agent device is processing the ongoing transaction on the real-time communication channel and a non-real-time transaction on a non-real-time communication channel concurrently;
transfers the ongoing transaction for the transaction to be processed to the first agent device; and
transfers the incoming transaction to the first agent device.

* * * * *